United States Patent [19]
Kawakami et al.

[11] Patent Number: 6,003,372
[45] Date of Patent: Dec. 21, 1999

[54] SEMICONDUCTOR ANGULAR VELOCITY DETERMINING DEVICE

[75] Inventors: Yuji Kawakami; Takafumi Hara; Masaaki Taruya, all of Tokyo, Japan

[73] Assignee: Mitsubishi Denki Kabushiki Kaisha, Tokyo, Japan

[21] Appl. No.: 08/742,490

[22] Filed: Nov. 1, 1996

[30] Foreign Application Priority Data

Jul. 12, 1996 [JP] Japan .................................... 8-183553

[51] Int. Cl.$^6$ .................................................. G01D 9/04
[52] U.S. Cl. ........................................................ 73/504.15
[58] Field of Search ........................... 73/504.12, 504.14, 73/504.15, 504.16, 497, 514.32

[56] References Cited

U.S. PATENT DOCUMENTS

| | | | |
|---|---|---|---|
| 4,750,364 | 6/1988 | Kawamura et al. | 73/504.16 |
| 5,633,594 | 5/1997 | Okada | 73/514.32 |

FOREIGN PATENT DOCUMENTS 5-322579   12/1993   Japan .

*Primary Examiner*—John E. Chapman
*Attorney, Agent, or Firm*—Sughrue, Mion, Zinn, Macpeak & Seas, PLLC

[57] ABSTRACT

A semiconductor angular velocity determining device includes a piezoelectric substance, a first substrate 21 disposed on the piezoelectric substance, a detector main body disposed on the first substrate 21 and a second substrate for holding the detector main body in cooperation with the first substrate 21 therebetween. The detector main body includes an oscillator 27 having a linear beam portion 26 with a one end 26a of the beam portion 26 being directly fixed to the first substrate 21. Further, the other end 26b of the beam portion 26 draws an elliptical locus in response to the combined force resulting from a force from the piezoelectric substance for producing oscillation along the plane of the first substrate 21 and a Coriolis force acting on the first substrate 21 in a perpendicular direction. With this arrangement, there can be obtained the semiconductor angular velocity determining device capable of improving a determining sensitivity and a determining accuracy.

15 Claims, 10 Drawing Sheets

SEMICONDUCTOR ANGULAR VELOCITY DETERMINING DEVICE

BACKGROUND OF THE INVENTION

1. Field of the Invention

The present invention relates to a semiconductor angular velocity determining device mounted on automobiles and the like for determining a rotational angular velocity.

2. Description of the Related Art

Figure 16:
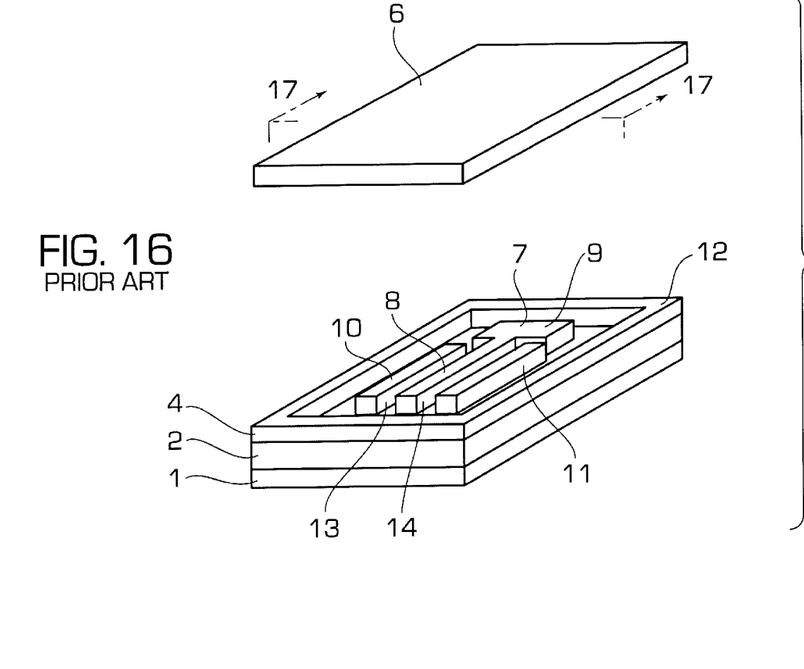
FIG. 16 is an exploded perspective view showing a conventional semiconductor angular velocity determining device.
Figure 17:
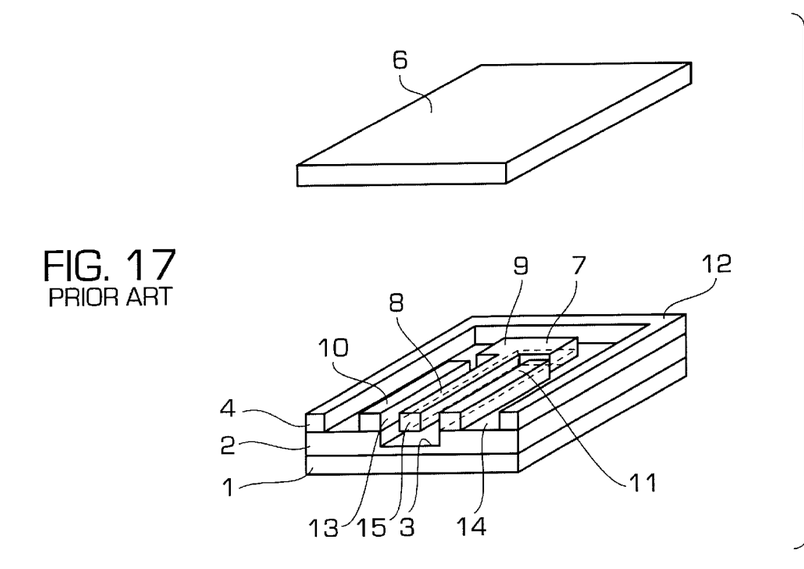
FIG. 17 is a cross-sectionally-exploded perspective view taken along the line A—A of FIG. 16.
Figure 18:
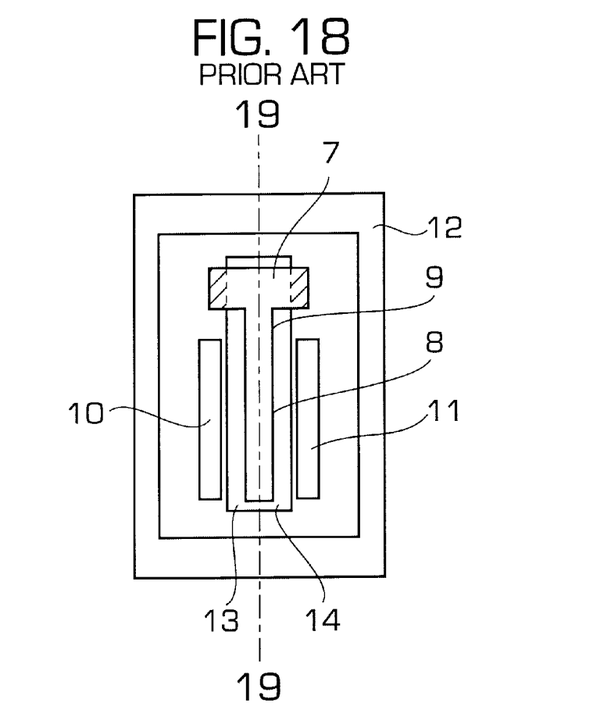
FIG. 18 is a plan view of the interior of the semiconductor angular velocity determining device of FIG. 16.
Figure 19:
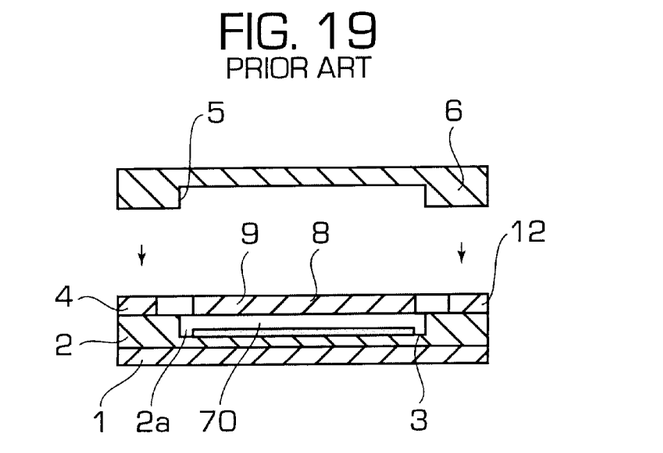
FIG. 19 is a cross sectional view taken along the line B—B of FIG. 18.

FIG. 16 is an exploded perspective view of a conventional semiconductor angular velocity determining device disclosed in Japanese Patent Laid Open No. 5-322579, FIG. 17 is a exploded perspective cross sectional view taken along the line A—A of FIG. 16, FIG. 18 is a plan view of the interior of the semiconductor angular velocity determining device of FIG. 16, and FIG. 19 is a cross sectional view taken along the line B—B of FIG. 18.

The semiconductor angular velocity determining device includes a piezoelectric substance 1 as an oscillation driving source, a first substrate 2 bonded to the piezoelectric substance 1, composed of a glass as an insulating material and having a rectangular recess 2a, a detector main body 4 mounted on the first substrate 2 and composed of a silicon material having a (110) oriented plane, a second substrate 6 mounted on the detector main body 4, composed of glass as an insulating material and having a rectangular recess 5, and a first substrate detecting electrode 3 disposed in the recess 2a.

The detector main body 4 includes a generally T-shaped oscillator 9 composed of a beam portion 8 and a support portion 7 to which wirings (not shown) are connected and formed, the beam portion 8 being flexibly deformable and capable of oscillation and the support portion 7 being bonded on the first substrate 2 at both the ends thereof, a first detecting electrode 10 and a second detecting electrode 11 disposed on either side of and parallel to the beam portion 8, and a frame 12 disposed to surround the oscillator 9, the first detecting electrode 10 and the second detecting electrode 11. The first substrate detecting electrode 3 and the beam portion 8 constitute a detecting capacitor 70.

Figure 20:
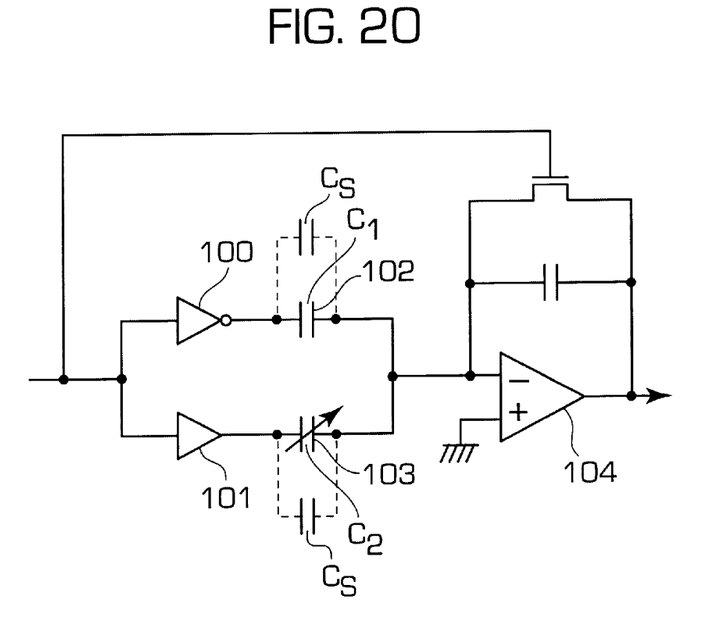
FIG. 20 is an electric circuit diagram of a semiconductor angular velocity determining device.

FIG. 20 is an electric circuit diagram of the semiconductor angular velocity determining device in which an inverter 100 is connected in parallel to an amplifier 101. A reference capacitor 102 having a given reference capacitance $C_1$ is connected in series to the inverter 100 and a detecting capacitor 103 having a variable detecting capacitance $C_2$ is connected in series to the amplifier 101. Further, the reference capacitor 102 and the detecting capacitor 103 are connected to a comparator 104. Cs in the drawing denotes a parasitic capacitance and when a clock signal is input to the electric circuit, an output voltage is supplied which is approximately proportional to $(C_1-C_2)/(C_1+C_2+2\times Cs)$.

Next, operation of the above semiconductor angular velocity determining device will be briefly described. When the beam portion 8 is oscillated in the direction of the first detecting electrode 10 and the second detecting electrode 11 (along width direction of the beam portion 8) by the piezoelectric substance 1, the oscillation driving source, the beam portion 8 makes a simple harmonic motion centered on the support portion 7 so that the distances of a first gap 13 between the beam portion 8 and the first detecting electrode 10 and a second gap 14 between the beam portion 8 and the second detecting electrode 11 change. As a result, the capacitances of the first gap 13 and the second gap 14 change and the maximum velocity of oscillation of the beam portion 8 is controlled so that it remains constant at all times by the values of the capacitances, that is, the velocity is controlled so that it remains constant at all times when the beam portion 8 is located in parallel with the first detecting electrode 10 and the second detecting electrode 11.

When a rotational angular velocity is applied to the oscillator 9 with the longitudinal direction of the beam portion 8 as a rotational axis system at the time the beam portion 8 makes the simple harmonic motion along the plane of the first substrate 2 centered on the support portion 7, a Coriolis force, which acts on the first substrate 2 in a vertical direction, is applied to the beam portion 8. As a result, the extreme end of the beam portion 8 is displaced along an elliptical locus by the combined force resulting from the Coriolis force and a force acting on the beam portion 8 along the first substrate 2, thus a third distance 15 between the beam portion 8 and the first substrate detecting electrode 3, that is, the detecting capacitance $C_2$ of the first detecting capacitor 70 composed of the beam portion 8 and the first substrate detecting electrode 3 changes.

In addition, a reference capacitor 102 is disposed externally which has a given reference capacitance $C_1$ and whose dielectric substance is composed of ceramic. An output voltage which is approximately proportional to $(C_1-C_2)/(C_1+C_2+2\times Cs)$ is obtained by comparing the reference capacitance $C_1$ and the detecting capacitance $C_2$ of the first detecting capacitor 70, and the output signal is input to a computer unit to determine the rotational angular velocity of the oscillator 9.

It is well known that a condition necessary for accurate determination of rotational angular velocity is that the resonance frequency of the oscillator 9 in the oscillating direction and the resonance frequency thereof in the direction of the Coriolis force be close to one another and it is preferable to form the oscillator 9 to a predetermined shape for this purpose.

Figure 21:
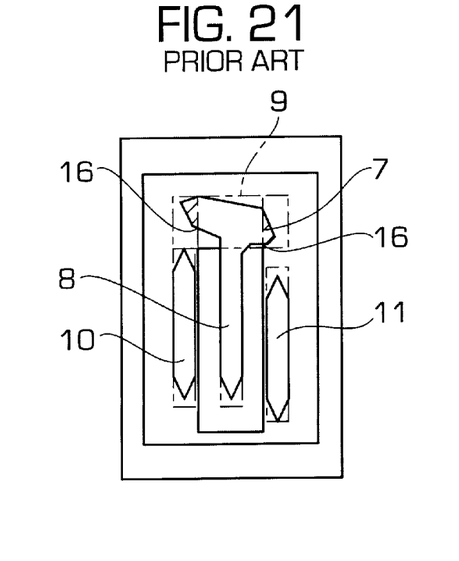
FIG. 21 is a plan view of the interior of the conventional semiconductor angular velocity determining device.

In the conventional semiconductor angular velocity determine device, the oscillator 9, the first detecting electrode 10 and the second detecting electrode 11 are made by forming, for example, a rectangular mask shown by the dot-dash line in FIG. 21 on a single silicon sheet bonded to the first substrate 2 and etching the mask.

When the oscillator 9 is made by anisotropically etching a silicon sheet having a (110) oriented plane, the dimension of the oscillator 9 in an oscillating direction, that is, the dimension thereof in the width direction of the beam portion 8 and the dimension of the oscillator 9 in the Coriolis force direction, that is, the dimension thereof in the thickness direction of the beam portion 8 can be controlled with a great accuracy. However, because of the high etching rate the support portion 7 is another matter. Support portion 7 in an actually made oscillator 9 is not symmetrical with respect to the center axis line of the beam portion 8 as shown by the solid line in FIG. 21 and further the oscillation origin points 16 of the beam portion 8 are also not located symmetrically with respect to the center axis line of the beam portion 8.

Thus, because the shape and dimensions of the oscillator 9 obtained by etching cannot be managed with any high accuracy, it is difficult to cause the resonance frequency of the oscillator 9 in the oscillating direction to coincide with the resonance frequency thereof in the Coriolis force direction and so rotational angular velocity cannot be determined accurately.

The reference capacitance $C_1$ is obtained by the reference capacitor 102 whose dielectric substance is composed of ceramic, whereas the detecting capacitance $C_2$ of the detecting capacitor 70 is obtained by the detecting capacitor 70 whose dielectric substance is composed of air. Therefore, since the material of the dielectric substance of the reference capacitor 102 is different from that of the detecting capacitor 70, a highly accurate rotational angular velocity cannot be determined because the dielectric constants of the respective dielectric substances have different temperature characteristics.

Further, since the reference capacitor 102 is disposed externally, wirings are needed to electrically connect the reference capacitor 102 to the detecting capacitor 70. However, there is a problem that noise is liable to be multiplexed with a signal through the wirings.

An object of the present invention is to solve the above problems to provide a semiconductor angular velocity determining device capable of enhanced sensitivity and accuracy.

SUMMARY OF THE INVENTION

A semiconductor angular velocity determining device according to the present invention is arranged such that one end of the beam portion of an oscillator is directly fixed to a first substrate.

The first substrate has a recess formed therein opposite the beam portion and a first substrate detecting electrode, which together with the beam portion constitutes a first detecting capacitor, is disposed in the recess, and a second substrate has a recess formed therein opposite the beam portion and a second substrate detecting electrode, which together with the beam portion constitutes a second detecting capacitor, is disposed in the recess.

A reference capacitor having a given gap distance and a given capacitance is disposed on the inside of first and second substrates.

One reference capacitor includes one end of the beam portion as an electrode and a reference capacitance electrode disposed opposite said one end.

Another reference capacitor includes a reference capacitance electrode disposed opposite one end of the beam portion and a first substrate reference electrode disposed in the recess of the first substrate opposite the reference capacitance electrode.

The reference capacitor includes the reference capacitance electrode disposed opposite one end of the beam portion and a second substrate reference electrode disposed in the recess of the second substrate opposite the reference capacitance electrode.

The reference capacitor includes an electrode extending in the longitudinal direction of the beam portion in parallel therewith and a reference capacitance electrode extending in the longitudinal direction of the beam portion opposite a plane opposite to the plane where the electrode confronts the beam portion.

The reference capacitor includes a reference capacitance electrode extending in the longitudinal direction of the beam portion in parallel therewith and a first substrate reference electrode extending in the longitudinal direction of the beam portion opposite the reference capacitance electrode and disposed in the recess formed in the first substrate.

The reference capacitor includes the reference capacitance electrode extending in the longitudinal direction of the beam portion in parallel therewith and a second substrate reference electrode extending in the longitudinal direction of the beam portion opposite the reference capacitance electrode and disposed in the recess formed in the second substrate.

The one end of the beam portion is fixed by being held between the first substrate and the second substrate.

The interior of a detector main body is evacuated and sealed by the first substrate and the second substrate.

The first substrate, the second substrate and the detector main body have substantially the same mechanical and physical properties.

DESCRIPTION OF THE PREFERRED EMBODIMENT

EXAMPLE 1

Figure 1:
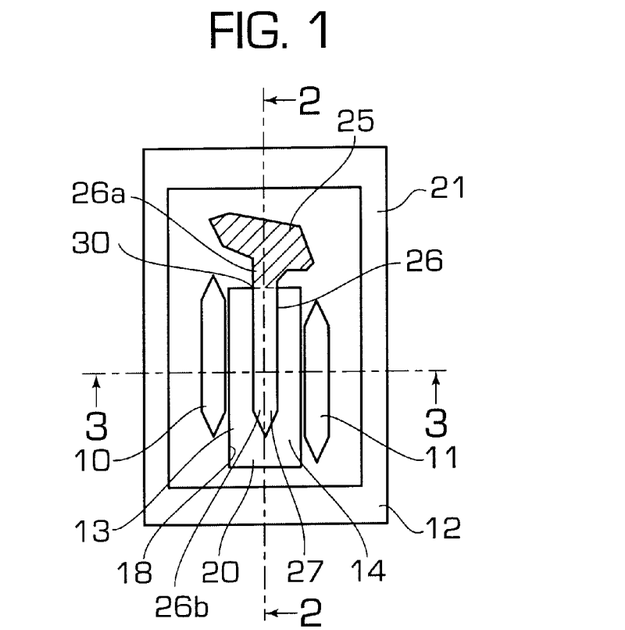
FIG. 1 is a plan view of the interior of a semiconductor angular velocity determining device of Example 1 of the present invention.
Figure 2:
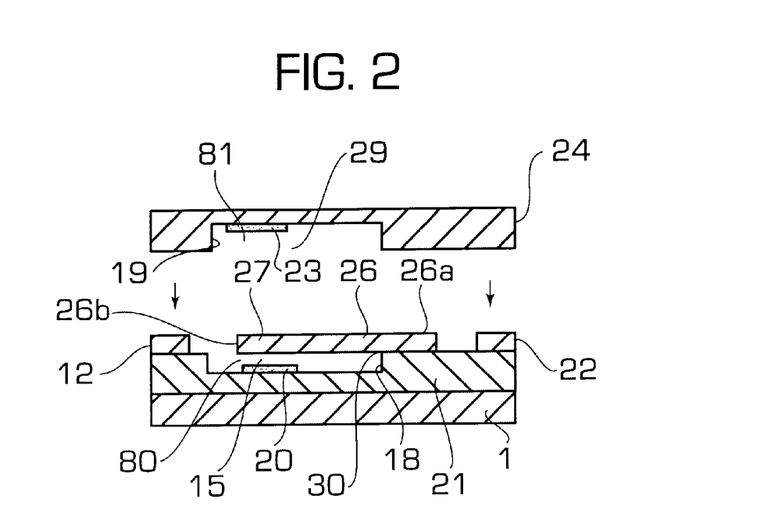
FIG. 2 is a cross sectional view taken along the line C—C of FIG. 1.
Figure 3:
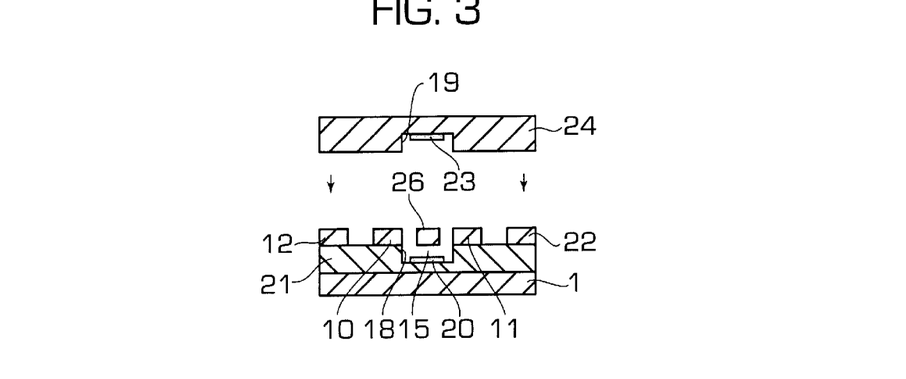
FIG. 3 is a cross sectional view taken along the line D—D of FIG. 1.

FIG. 1 is a plan view of the interior of a semiconductor angular velocity determining device showing Example 1 of the present invention, FIG. 2 is a cross sectional view taken along the line C—C of FIG. 1 and FIG. 3 is a cross sectional view taken along the line D—D of FIG. 1.

The semiconductor angular velocity determining device includes a piezoelectric substance 1 as an oscillation driving source, a first substrate 21 bonded to the piezoelectric substance 1 and composed of glass as an insulating material as well as having a first substrate detecting electrode 20 disposed in a rectangular recess 18, a detector main body 22 mounted on the first substrate 21 and composed of a silicon material having a (110) oriented plane, and a second substrate 24 mounted on the detector main body 22 and composed of glass as an insulating material as well as having a second substrate detecting electrode 23 disposed in a rectangular recess 19. Note, the interior of the detector main body 22 held between the first substrate 21 and the second substrate 24 is evacuated and sealed.

The detector main body 22 includes a oscillator 27 formed substantially to a T-shape as a whole and composed of a support portion 25 entirely bonded on the first substrate 21 and a linear beam portion 26 capable of being flexibly deformable and oscillated, a first detecting electrode 10 and a second detecting electrode 11 disposed on both the sides of the beam portion 26 in parallel therewith, respectively, and a frame 12 disposed to surround the oscillator 27, the first detecting electrode 10 and the second detecting electrode 11. Note, the beam portion 26 and the first substrate detecting electrode 20 constitute a first detecting capacitor 80 and the beam portion 26 and the second substrate detecting electrode 23 constitute a second detecting capacitor 81. Although not shown, wirings are connected to the support portion 25 to take out the capacitances of the first detecting capacitor 80 and the second detecting capacitor 81 to the outside.

The oscillator 27 is arranged such that the support portion 25 shown by hatching in FIG. 1 and one end 26a of the beam portion 26 are directly bonded to the first substrate 21 and the oscillator 27 is held between the first substrate 21 and the second substrate 24. As described above, the support portion 25 made to an inaccurate shape is supported and fixed by the first substrate 21 and the second substrate 24 as a whole as well as the beam portion 26 which is formed to an accurate shape is oscillated at the one end 26a thereof using the edge of the recess 18 (extending in a vertical direction with respect to the longitudinal direction of the beam portion 26) as an oscillation origin point 30. Since the oscillation origin point 30 of the beam portion 26 extends in the direction perpendicular to the longitudinal direction of the beam portion 26 as described above, the dimension of the part of the beam portion 26 where it oscillates can be easily managed and a resonance frequency in an oscillating direction can be easily caused to coincide with a resonance frequency in a Coriolis force direction.

The first substrate 21 and the second substrate 24 are composed of a material which has the values of mechanical and physical properties near to those of the oscillator 27 composed of the silicon. For example, as to Young's modulus the oscillator 27 has a value of $1.90 \times 10^{11}$ Pa, whereas the first substrate 21 and the second substrate 24 have a value of $6.17 \times 10^{10}$ Pa. Therefore, even if the first substrate 21, the second substrate 24 and the oscillator 27 are subjected to an external force such as oscillation and the like, the relative positional displacement of the oscillator 27 is difficult to be caused with respect to the first substrate 21 and the second substrate 24. As a result, even if the semiconductor angular velocity determining device is used for a long time, the deviation between the resonance frequency of the oscillator 27 in the oscillating direction and the resonance frequency thereof in the Coriolis force direction can be suppressed to a small value.

Next, operation of the above semiconductor angular velocity determining device will be briefly described. When the beam portion 26 is oscillated in the direction of the first detecting electrode 10 and the second detecting electrode 11 (the width direction of the beam portion 26) by the piezoelectric substance 1 as the oscillation driving source, the beam portion 26 makes a simple harmonic motion centered on the oscillation origin point 30. As a result, the distances of a first gap 13 between the beam portion 26 and the first detecting electrode 10 and a second gap 14 between the beam portion 26 and the second detecting electrode 11 change and the capacitances of the respective gaps 13, 14 change, so that the maximum oscillating velocity of the beam portion 26 (when the beam portion 26 is disposed in parallel with the first detecting electrode 10 and the second detecting electrode 11) is controlled constant at all times.

When a rotational angular velocity is applied to the oscillator 27 with the longitudinal direction of the beam portion 26 as a rotational axis system at the time the linear beam portion 26 is oscillated in the width direction thereof, a Coriolis force acts on the beam portion 26 in the thickness direction thereof. As a result, the other end 26b of the beam portion 26 is displaced while drawing an elliptical locus, so that the distance of a third gap 15 between the beam portion 26 and the first substrate detecting electrode 20 and the distance of a fourth gap 29 between the beam portion 26 and the second substrate detecting electrode 23 change simultaneously and the capacitances of the first detecting capacitor 80 and the second detecting capacitor 81 change.

Since the interior of the detector main body 22 is evacuated and sealed, certain problems can be avoided. For example the beam portion 26 by a predetermined amount with respect to the Coriolis force will not be, for example, affected by the interference of air.

In addition, an output voltage is supplied which is approximately in proportion to $(C_1-C_2)/(C_1+C_2+2 \times Cs)$ by the comparison of the reference capacitance $C_1$ of a reference capacitor 102 disposed to the outside with the detected capacitance $C_2$ obtained from the first detecting capacitor 80 and the second detecting capacitor 81 and the output signal is input to a computer unit to determine the rotational angular velocity of the oscillator 27.

The displacement of the beam portion 26 in the Coriolis force direction is obtained from the first detecting capacitor 80 and the second detecting capacitor 81, and the detected capacitance is obtained from the two detecting capacitors 80, 81 as compared with that the conventional determining device obtains the detected capacitance from only the detecting capacitor 70, thus a sensitivity for determining the rotational angular velocity can be improved.

Note, although Example 1 employs the detector main body 22 composed of the silicon having the (110) oriented plane, a detector main body composed of a silicon having, for example, a (100) oriented plane may be used.

EXAMPLE 2

Figure 4:
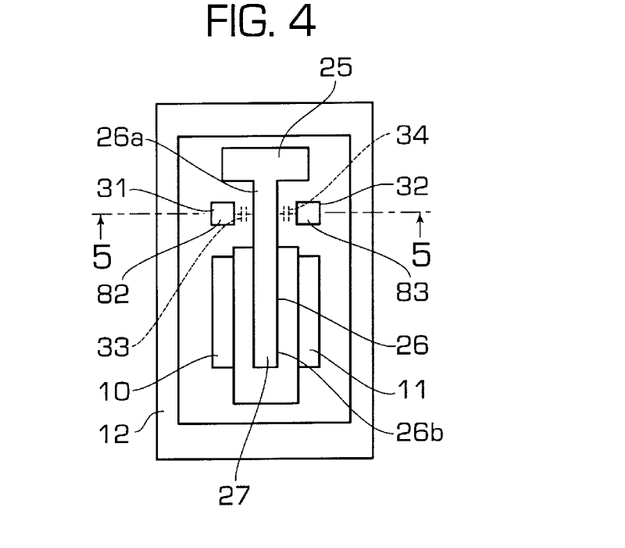
FIG. 4 is a plan view of the interior of a semiconductor angular velocity determining device of Example 2 of the present invention.
Figure 5:
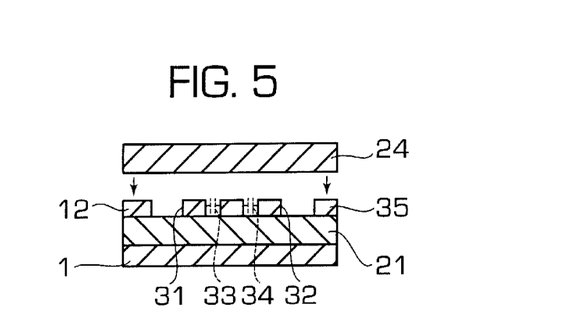
FIG. 5 is a cross sectional view taken along the line E—E of FIG. 4.

FIG. 4 is a plan view of the interior of a semiconductor angular velocity determining device showing Example 2 of the present invention and FIG. 5 is a cross sectional view taken along the line E—E of FIG. 4.

The semiconductor angular velocity determining device includes a first reference capacitance electrode 31 and a second reference capacitance electrode 32 each composed of silicon and disposed on both the sides of the base end 28 of a beam portion 26.

A first reference capacitor 82 composed of the beam portion 26 constituting an electrode and the first reference capacitance electrode 31 includes a first fixed gap 33 having a given distance and a second reference capacitor 83 composed of the beam portion 26 and the second reference capacitance electrode 32 includes a second fixed gap 34 having a given distance. Further, the interior of a detector main body 35 held between a first substrate 21 and a second substrate 24 is evacuated and sealed.

In Example 2, since the distances of the first fixed gap 33 of the first reference capacitor 82 and the distance of the second fixed gap 34 of the second reference capacitor 83 are given, the value of a reference capacitance $C_1$ is given. Therefore, although long wirings are needed in the conventional device to electrically connect the reference capacitor 102 to the detecting capacitor 70 due to the disposition of the reference capacitor 102 to the outside, since the wirings can be greatly shortened in this example, noise multiplexed with a signal through the wirings can be reduced.

In addition, a detected capacitance $C_2$ is obtained from a first detecting capacitor 80 and a second detecting capacitor 81 likewise Example 1 and the rotational angular velocity of an oscillator 27 is detected by the comparison of the reference capacitance $C_1$ of the reference capacitors 82, 83 with the detected capacitance $C_2$ of the detecting capacitors 80, 81.

Note, since the interior of the detector main body 35 is evacuated and sealed, there can be avoided such a disadvantage that the beam portion 26 is not displaced a predetermined amount with respect to a Coriolis force by, for example, the interference of air. In addition, since vacuum is used to the dielectric substance of the reference capacitors 82, 83 and the detecting capacitors 80, 81 and the dielectric constants of the capacitors have the same temperature characteristics, a rotational angular velocity of high accuracy can be obtained without being affected by temperature. Further, since the beam portion 26 also serves a portion of the reference capacitors 82, 83, a structure can be simplified.

EXAMPLE 3

Figure 6:
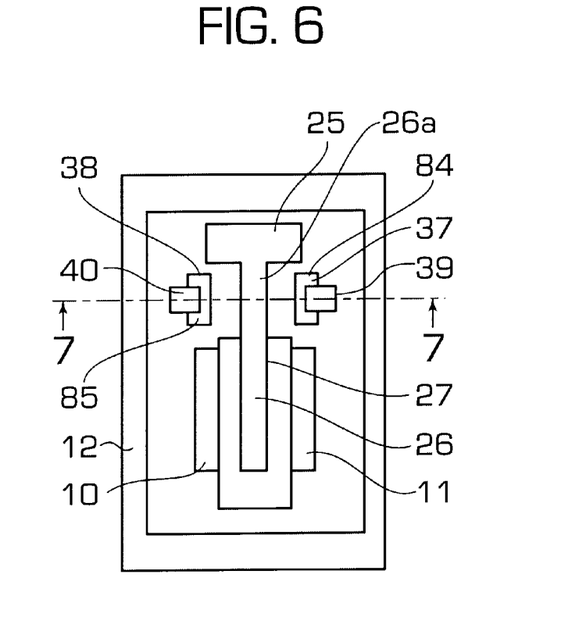
FIG. 6 is a plan view of the interior of a semiconductor angular velocity determining device of Example 3 of the present invention.
Figure 7:
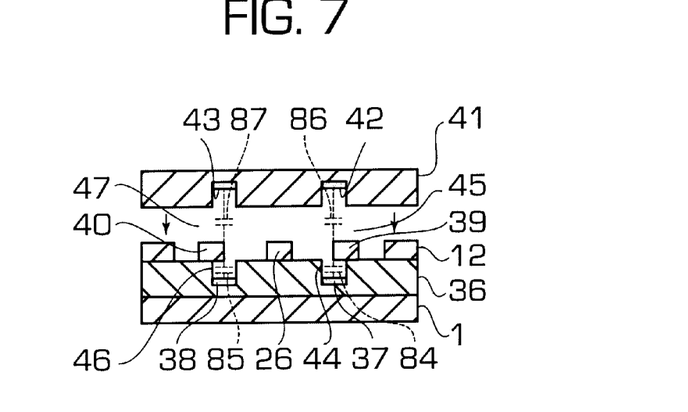
FIG. 7 is a cross sectional view taken along the line F—F of FIG. 6.

FIG. 6 is a plan view of the interior of a semiconductor angular velocity determining device showing Example 3 of the present invention and FIG. 7 is a cross sectional view taken along the line F—F of FIG. 6.

In Example 3, the structure of a reference capacitor is different from that of the reference capacitor of Example 2. A pair of recesses are formed to a first substrate 36 composed of glass and a first reference capacitance electrode 37 and a second reference capacitance electrode 38, as first substrate reference electrodes are disposed in the recess, respectively. A third reference capacitance electrode 39 is disposed opposite the first reference capacitance electrode 37 and a fourth reference capacitance electrode 40 is disposed opposite the second reference capacitance electrode 38 on both the sides of the beam portion 26. Further, a pair of recesses are formed to a second substrate 41 composed of glass, a fifth reference capacitance electrode 42 as a second substrate reference electrode is disposed opposite the third reference capacitance electrode 39 and a sixth reference capacitance electrode 43 as a second substrate reference electrode is disposed opposite the fourth reference capacitance electrode 40 in these recesses. Then, a first fixed gap 44 is formed between the first reference capacitance electrode 37 and the third reference capacitance electrode 39 and a second fixed gap 45 is formed between the third reference capacitance electrode 39 and the fifth reference capacitance electrode 42.

Further, a third fixed gap 46 is formed between the second reference capacitance electrode 38 and the fourth reference capacitance electrode 40 and a fourth fixed gap 47 is formed between the fourth reference capacitance electrode 40 and the sixth reference capacitance electrode 43.

Note, the first reference capacitance electrode 37 and the third reference capacitance electrode 39 constitute a first reference capacitor 84 and the second reference capacitance electrode 38 and the fourth reference capacitance electrode 40 constitute a second reference capacitor 85. In addition, the third reference capacitance electrode 39 and the fifth reference capacitance electrode 42 constitute a third reference capacitor 86 and the fourth reference capacitance electrode 40 and the sixth reference capacitance electrode 43 constitute a fourth reference capacitor 87. Since the respective reference capacitors 84, 85, 86, 87 having these fixed gaps 44, 45, 46, 47 are electrically connected in parallel with one another, a reference capacitance $C_1$ obtained from the respective reference capacitors 84, 85, 86, 87 has a large value.

In Example 3, the number of the positions where the fixed gaps are formed is increased and a reference capacitance is increased accordingly, thus determining sensitivity of a rotational angular velocity is improved as compared with Example 2.

EXAMPLE 4

Figure 8:
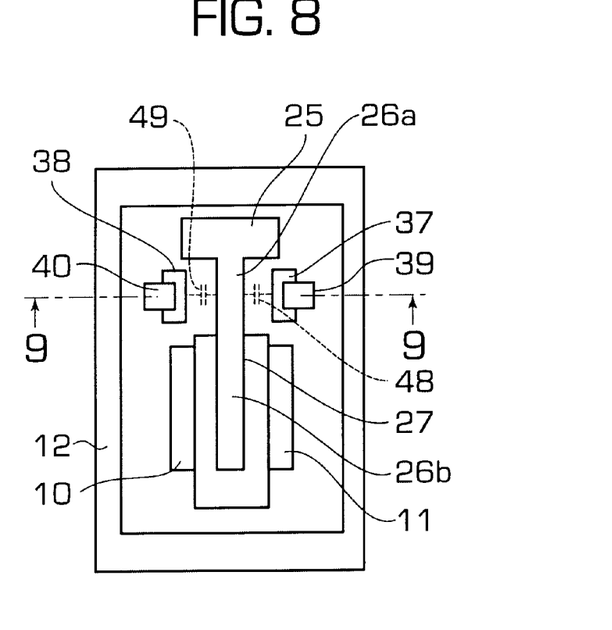
FIG. 8 is a plan view of the interior of a semiconductor angular velocity determining device of Example 4 of the present invention.
Figure 9:
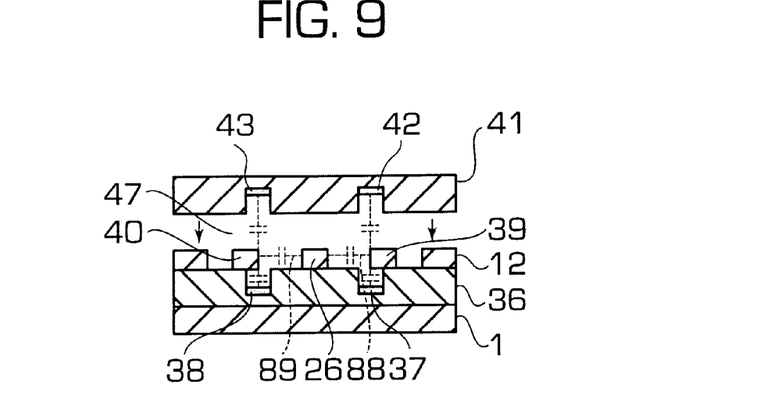
FIG. 9 is a cross sectional view taken along the line G—G of FIG. 8.

FIG. 8 is a plan view of the interior of a semiconductor angular velocity determining device showing Example 4 of the present invention and FIG. 9 is a cross sectional view taken along the line G—G of FIG. 8.

Example 4 is different from Example 3 in that a fifth reference capacitor 88 composed of a third reference capacitance electrode 39 and a beam portion 26 constituting an electrode has a fifth fixed gap 48 and a sixth reference capacitor 89 composed of a fourth reference capacitance electrode 40 and the beam portion 26 has a sixth fixed gap 49. Further, the respective reference capacitors are electrically connected in parallel with one another also in Example 4.

In Example 4, the number of the positions where the fixed gaps are formed is increased and a reference capacitance is increased accordingly, thus an angular velocity detecting accuracy is improved as compared with Example 3. Further, since the beam portion 26 also serves as a portion of the reference capacitor, a structure is simplified.

EXAMPLE 5

Figure 10:
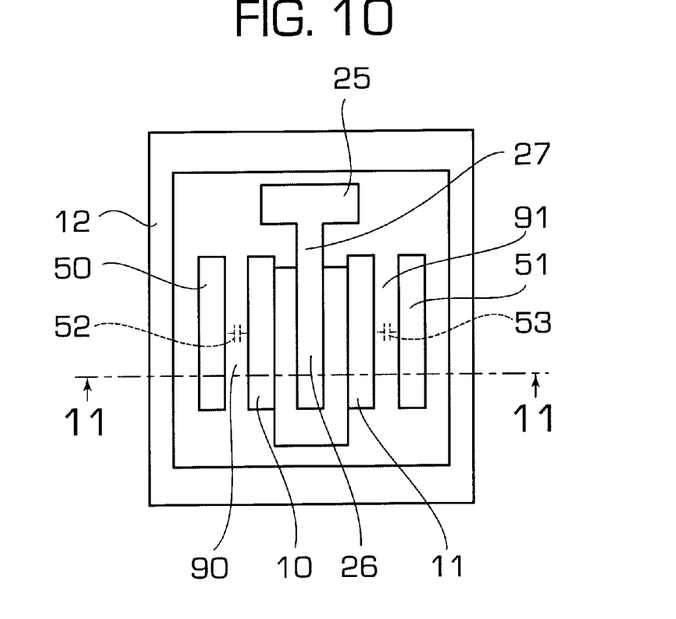
FIG. 10 is a plan view of the interior of a semiconductor angular velocity determining device of Example 5 of the present invention.
Figure 11:
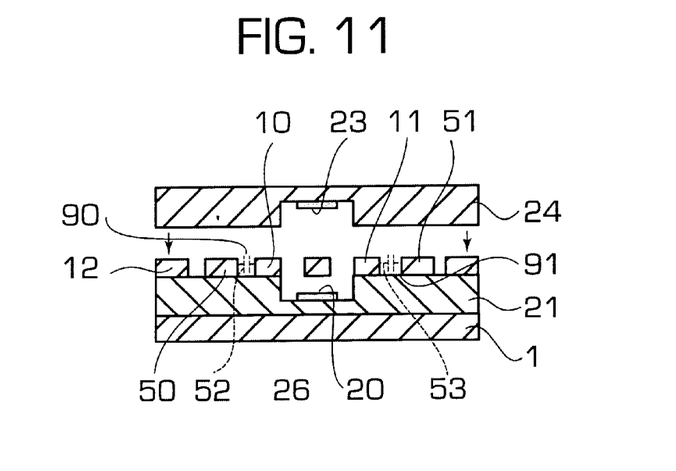
FIG. 11 is a cross sectional view taken along the line H—H of FIG. 10.

FIG. 10 is a plan view of the interior of a semiconductor angular velocity determining device showing Example 5 of the present invention and FIG. 11 is a cross sectional view taken along the line H—H of FIG. 10.

Example 5 is different from Example 1 in that a first reference capacitance electrode 50 which constitutes a first reference capacitor 90 together with a first detecting electrode 10 is disposed outwardly of the first detecting electrode 10 in confrontation therewith and a second reference capacitance electrode 51 which constitutes a second reference capacitor 91 together with a second detecting electrode 11 is disposed outwardly of the second detecting electrode 11 in confrontation therewith. Then, a first fixed gap 52 is formed between the first detecting electrode 10 and the first reference capacitance electrode 50 and a second fixed gap 53 is formed between the second detecting electrode 11 and the second reference capacitance electrode 51.

In Example 5, the areas where the detecting electrodes 10 and 11 which extend in the lengthwise direction of the beam portion 26 confront the reference capacitance electrodes 50 and 51, respectively increase as compared with Examples 1–4 and a reference capacitance increases accordingly, thus an angular velocity detecting accuracy is improved. Further, since the detecting electrodes 10, 11 for controlling the oscillating velocity of a beam portion 26 also serve as a portion of the reference capacitors 90, 91, a structure is simplified.

EXAMPLE 6

Figure 12:
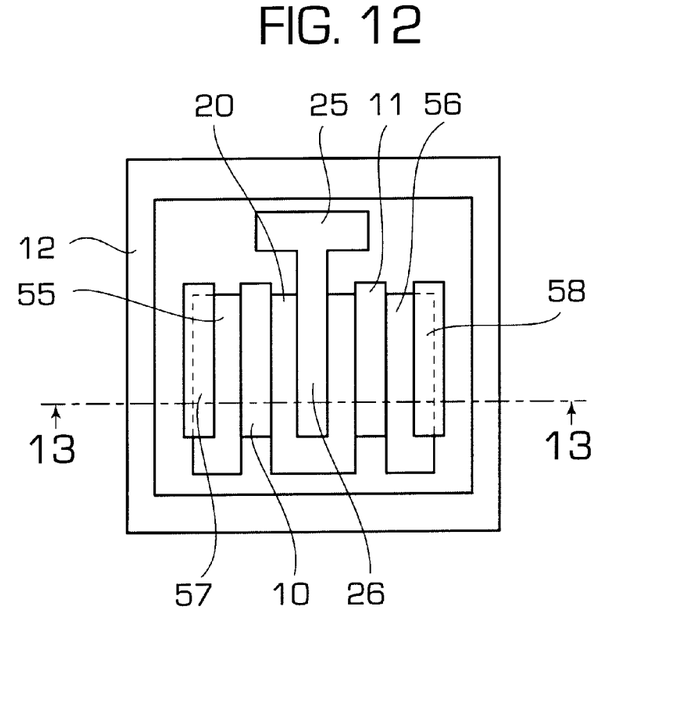
FIG. 12 is a plan view of the interior of a semiconductor angular velocity determining device of Example 6 of the present invention.
Figure 13:
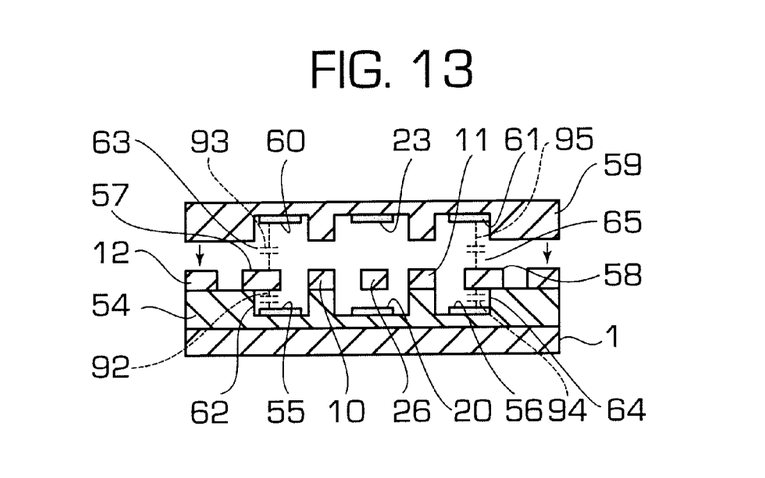
FIG. 13 is a cross sectional view taken along the line I—I of FIG. 12.

FIG. 12 is a plan view of the interior of a semiconductor angular velocity determining device showing Example 6 of the present invention and FIG. 13 is a cross sectional view taken along the line I—I of FIG. 12;

In Example 6, a plurality of recesses are formed on a first substrate 54 composed of glass and a first reference capacitance electrode 55 and a second reference capacitance electrode 56 as first substrate reference electrodes are disposed in these recesses, respectively. A third reference capacitance electrode 57 is disposed between a first detecting electrode 10 and a frame 12 and a fourth reference capacitance electrode 58 is disposed between a second detecting electrode 11 and the frame 12. Further, a fifth reference capacitance electrode 60 and a sixth reference capacitance electrode 61 as second substrate reference electrodes are disposed in a plurality of the recesses of a second substrate 59 composed of glass, respectively. Then, a first reference capacitor 92 composed of the first reference capacitance electrode 55 and the third reference capacitance electrode 57 has a first fixed gap 62. A second reference capacitor 93 composed of the third reference capacitance electrode 57 and the fifth reference capacitance electrode 60 has a second fixed gap 63. A third reference capacitor 94 composed of the second reference capacitance electrode 56 and the fourth reference capacitance electrode 58 has a third fixed gap 66. A fourth reference capacitor 95 composed of the fourth reference capacitance electrode 58 and the sixth reference capacitance electrode 61 has a fourth fixed gap 65.

In Example 6, the sum of the confronting areas between the respective reference capacitance electrodes further increases as compared with that of Example 5 and a reference capacitance is increased accordingly, thus an angular velocity detecting accuracy is improved.

EXAMPLE 7

Figure 14:
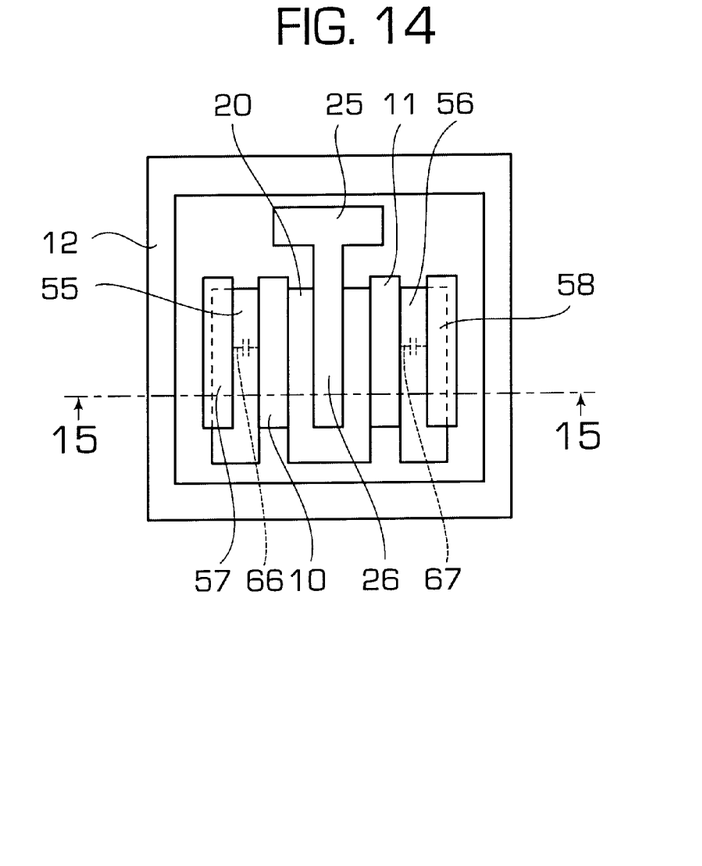
FIG. 14 is a plan view of the interior of a semiconductor angular velocity determining device of Example 7 of the present invention.
Figure 15:
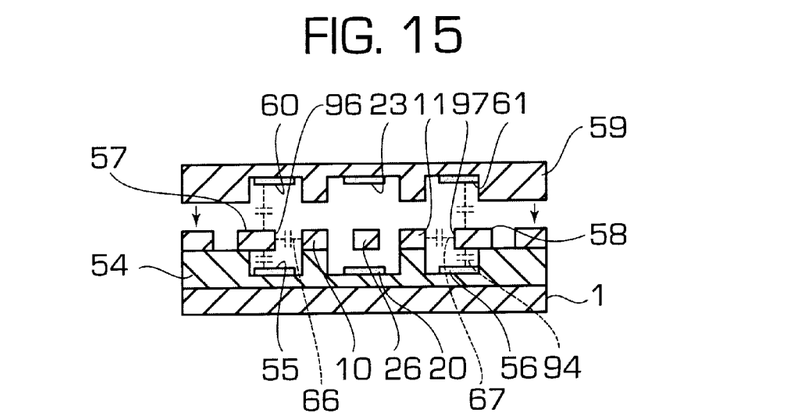
FIG. 15 is a cross sectional view taken along the line J—J of FIG. 14.

FIG. 14 is a plan view of the interior of a semiconductor angular velocity determining device showing Example 7 of the present invention and FIG. 15 is a cross sectional view taken along the line J—J of FIG. 14.

Example 7 is different from Example 6 in that it further includes a fifth reference capacitor 96 composed of a first detecting electrode 10 and a third reference capacitance electrode 57 and having a fifth fixed gap 66 and a sixth reference capacitor 97 composed of a second detecting electrode 11 and a fourth reference capacitance electrode 58 and having a sixth fixed gap 67. As a result, the sum of the confronting areas between the respective reference capacitance electrodes further increases as compared with that of Example 6 and a reference capacitance is increased accordingly, thus an angular velocity detecting accuracy is improved.

As described above, according to the semiconductor angular velocity determining device of the present invention, since the one end of the beam portion of the oscillator is directly fixed to the first substrate, the dimension of the oscillating part of the beam portion can be easily managed when the oscillator used is composed of, for example, the silicon having a (110) oriented plane and a resonance frequency in an oscillating direction can be caused to easily coincide with a resonance frequency in a Coriolis force direction, thus the semiconductor angular velocity determining device having a high detecting sensitivity can be easily obtained.

Since the first substrate has the recess formed therein opposite the beam portion and the first substrate detecting electrode constituting the first detecting capacitor together with the oscillator is disposed in the recess and the second substrate has the recess formed therein opposite the beam portion and the second substrate detecting electrode constituting the second detecting capacitor together with the beam portion is disposed in the recess, the capacitances of the detecting capacitors can be simultaneously obtained from the two positions, thus the detecting sensitivity of a rotational angular velocity is improved.

Since the reference capacitor having the given gap distance and the given capacitance is disposed to the inside in the present invention, wirings for electrically connecting the reference capacitor to the detecting capacitors can be greatly shortened, so that noise multiplexed with a signal through the wirings can be reduced as compared with the conventional reference capacitor which is disposed to the outside and requires long wirings for electrically connecting it to detecting capacitors.

Since the base end of the beam portion is fixed by being held between the first substrate and the second substrate, even if the beam portion is used for a long time, it is not displaced with respect to the first substrate and the second substrate, thus a high detecting accuracy can be maintained.

Since the interior of the detector main body is evacuated and sealed by the first substrate and the second substrate, certain problems can be avoided. For example, displacement of the beam portion by a predetermined amount with respect to a Coriolis force will not be affected. For example, there will be no interference air since a vacuum is used. Alas, since the dielectric substance of the reference capacitors and the detecting capacitors and the dielectric constants of the capacitors have the same temperature characteristics, a rotational angular velocity of high accuracy can be obtained without being affected by temperature variation.

Further, since the first substrate, the second substrate and the detector main body have substantially the same mechanical and physical properties, even if the first substrate, the second substrate and the oscillator are subjected to an external force such as oscillation and the like, the relative position of the oscillator is not changed with respect to the first substrate and the second substrate, thus deviation between a resonance frequency in an oscillating direction and a resonance frequency in a Coriolis force direction can be suppressed to a small value for a long time.

What is claimed is:

1. A semiconductor angular velocity determining device, comprising:
    an oscillation driving source;
        a first substrate disposed on said oscillation driving source;
        a detector main body disposed on said first substrate having an oscillator including a longitudinally extending linear beam portion; and
        a second substrate for holding said detector main body in cooperation with said first substrate therebetween, wherein one end of said beam portion is directly fixed to said first substrate in a direction perpendicular to longitudinal axis of said linear beam portion and the other end thereof draws an elliptical locus in response to the combined force resulting from a force from said oscillation driving source for producing oscillation along the plane of said first substrate and a Coriolis force acting on said first substrate in a perpendicular direction, wherein said oscillator comprises a linear beam portion defined by a longitudinal axis and a support portion extending transverse to said longitudinal axis, both said support portion and one end of said beam portion being directly fixed.

2. A semiconductor angular velocity determining device according to claim 1, wherein said detector main body is composed of silicon having a (110) oriented plane.

3. A semiconductor angular velocity determining device according to claim 1, wherein:

a recess is formed in said first substrate opposite said beam portion and a first substrate detecting electrode, which constitutes a first detecting capacitor together with said beam portion, is disposed in said recess; and a recess is formed in said second substrate opposite said beam portion and a second substrate detecting electrode, which constitutes a second detecting capacitor together with said beam portion, is disposed in said recess.

4. A semiconductor angular velocity determining device according to claim 1, wherein one end of said beam portion is fixed by being held between said first substrate and said second substrate.

5. A semiconductor angular velocity determining device according to claim 1, wherein the interior of said detector main body is evacuated and sealed by said first substrate and said second substrate.

6. A semiconductor angular velocity determining device according to claim 1, wherein said first substrate, said second substrate and said detector main body have substantially the same mechanical and physical properties.

7. A semiconductor angular velocity determining device comprising:

an oscillation driving source;

a first substrate disposed on said oscillation driving source;

a detector main body disposed on said first substrate having an oscillator including a longitudinally extending linear beam portion having an extreme end which draws an elliptical locus in response to the combine force resulting from a force from said oscillation driving source for producing oscillation along the plane of said first substrate and a Coriolis force action on said first substrate in a perpendicular direction;

a second substrate for holding said detector main body in cooperation with said first substrate therebetween;

a first substrate detecting electrode disposed in a recess formed in said first substrate opposite said beam portion and constituting a first detecting capacitor together with said beam portion; and a second substrate detecting electrode disposed in a recess formed in said second substrate opposite said beam portion and constituting a second detecting capacitor together with said beam portion, wherein as said beam portion is displaced, the capacitance of said first detecting capacitor changes in accordance with the size of the gap between said beam portion and said first substrate detecting electrode as the size of the gap between said beam portion and said second substrate detecting electrode simultaneously changes, whereby the capacitance of said second detecting capacitor also changes; and wherein one end of said linear beam portion opposite said extreme end is directly fixed to said first substrate in a direction perpendicular to longitudinal axis of said linear beam portion, wherein said oscillator comprises a linear beam portion defined by a longitudinal axis and a support portion extending transverse to said longitudinal axis, both said support portion and one end of said beam portion being directly fixed.

8. A semiconductor angular velocity determining device comprising:

an oscillation driving source;

a first substrate disposed on said oscillation driving source and having a first substrate detecting electrode;

a detector main body having an oscillator including an extreme end which draws an elliptical locus in response to the combined force resulting from a force from said oscillation driving source for producing oscillation along the plane of said first substrate and a Coriolis force acting to said first substrate in a perpendicular direction and disposed on said first substrate;

a second substrate for holding said detector main body in cooperation with said first substrate therebetween;

a detecting capacitor composed of said beam portion and said first substrate detecting electrode positioned opposite said beam portion and having a capacitance which changes in accordance with the size of a gap between said first substrate detecting electrode and said beam portion; and a reference capacitor structure disposed on the inside of said first and second substrates and having a given gap distance and a given capacitance, wherein the angular velocity of said oscillator is determined by comparing the capacitance of said reference capacitor structure with the capacitance of said detecting capacitor.

9. A semiconductor angular velocity determining device according to claim 8, wherein said reference capacitor structure includes a first reference capacitor composed of one end of said beam portion and a first reference capacitance electrode disposed at one end of said beam portion opposite each other, and a second reference capacitor composed of one end of said beam portion and a second reference capacitance electrode disposed at one end of said beam portion opposite each other.

10. A semiconductor angular velocity determining device according to claim 8, wherein said reference capacitor structure includes a first reference capacitor composed of a first reference capacitance electrode disposed at one end of said beam portion opposite said beam portion and a second reference capacitance electrode disposed in a recess of said first substrate opposite said first reference capacitance electrode, and a second reference capacitor composed of a third reference capacitance electrode disposed at one end of said beam portion opposite said beam portion and a fourth reference capacitance electrode disposed in the recess of said first substrate opposite said third reference capacitance electrode.

11. A semiconductor angular velocity determining device according to claim 8, wherein said reference capacitor structure includes a first reference capacitor composed of a first reference capacitance electrode disposed at one end of said beam portion opposite said beam portion and a second reference capacitance electrode disposed in a recess of said second substrate opposite said first reference capacitance electrode, and a second reference capacitor composed of a third reference capacitance electrode disposed at one end of said beam portion opposite said beam portion and a fourth reference capacitance electrode disposed in the recess of said second substrate opposite said third reference capacitance electrode.

12. A semiconductor angular velocity determining device according to claim 8, wherein said reference capacitor structure includes a first reference capacitor composed of a first electrode extending in the longitudinal direction of said beam portion in parallel therewith and a first reference capacitance electrode extending in the longitudinal direction of said beam portion outside of parallel to and aligned with said first electrode, a second reference capacitor composed of a second electrode extending in the longitudinal direction of said beam portion in parallel therewith and a second reference capacitance electrode extending in the longitudinal direction of said beam portion outside of parallel to and aligned with said second electrode.

13. A semiconductor angular velocity determining device according to claim 8, wherein said reference capacitor structure includes a first reference capacitor composed of a first reference capacitance electrode extending in the longitudinal direction of said beam portion in parallel therewith and a second reference capacitance electrode disposed in a recess formed in said first substrate opposite said first reference capacitance electrode, a second reference capacitor composed of a third reference capacitance electrode extending in the longitudinal direction of said beam portion in parallel therewith and a fourth reference capacitance electrode disposed in a recess formed in said first substrate opposite said third reference capacitance electrode.

14. A semiconductor angular velocity determining device according to claim 8, wherein said reference capacitor structure includes a first reference capacitor composed of a first reference capacitance electrode extending in the longitudinal direction of said beam portion in parallel therewith and a second reference electrode disposed in a recess formed in said second substrate opposite said first reference capacitance electrode, a second reference capacitor composed of a third reference capacitance electrode extending in the longitudinal direction of said beam portion in parallel therewith and a fourth reference electrode disposed in a recess formed in said second substrate opposite said third reference capacitance electrode.

15. A semiconductor angular velocity determining device comprising:

an oscillation driving source;

a first substrate disposed on said oscillation driving source;

a detector main body disposed on said first substrate having an oscillator including a linear beam portion having an extreme end which draws an elliptical locus in response to the combine force resulting from a force from said oscillation driving source for producing oscillation along the plane of said first substrate and a Coriolis force action on said first substrate in a perpendicular direction;

a second substrate for holding said detector main body in cooperation with said first substrate therebetween;

a first substrate detecting electrode disposed in a recess formed in said first substrate opposite said beam portion and constituting a first detecting capacitor together with said beam portion; and a second substrate detecting electrode disposed in a recess formed in said second substrate opposite said beam portion and constituting a second detecting capacitor together with said beam portion, wherein as said beam portion is displaced, the capacitance of said first detecting capacitor changes in accordance with the size of the gap between said beam portion and said first substrate detecting electrode as the size of the gap between said beam portion and said second substrate detecting electrode simultaneously chances, whereby the capacitance of said second detecting capacitor also changes; and wherein one end of said linear beam portion is directly fixed to said first substrate, wherein a reference capacitor having a given gap distance and a given capacitance is disposed therein and the angular velocity of said oscillator is determined by comparing the capacitance of said reference capacitor with the capacitance of said first and second detecting capacitors.

\* \* \* \* \*